Jan. 18, 1927.

U. HUTCHINSON 1,614,476

ROTARY INTERNAL COMBUSTION ENGINE

Original Filed March 30, 1916   3 Sheets-Sheet 2

Attest:

Uriah Hutchinson  Inventor:
by Frank P. Wentworth
his Atty.

Jan. 18, 1927.  U. HUTCHINSON  1,614,476
ROTARY INTERNAL COMBUSTION ENGINE
Original Filed March 30, 1916   3 Sheets-Sheet 3

Attest:

Uriah Hutchinson Inventor;
by Frank P. Wentworth
his Atty.

Patented Jan. 18, 1927.

1,614,476

UNITED STATES PATENT OFFICE.

URIAH HUTCHINSON, OF NEW YORK, N. Y., ASSIGNOR, BY MESNE ASSIGNMENTS, TO MOTOR PATENTS CORPORATION, OF NEW YORK, N. Y., A CORPORATION OF NEW YORK.

ROTARY INTERNAL-COMBUSTION ENGINE.

Application filed March 30, 1916, Serial No. 87,682. Renewed June 3, 1926.

My invention relates to rotary internal combustion engines and more particularly to an engine of this type wherein the power is derived from double acting pistons.

An engine made in accordance with my invention is so constructed as to secure high efficiency in an engine of small dimensions. This result is secured by providing a rotor including therein a plurality of cylinders, each having mounted therein a double acting piston, the thrust of which upon the power stroke, is against a cam groove extending circumferentially about the stator, the intake, the exhaust and the ignition for the various cylinders, being so arranged as to secure a substantially continuous application of power to the rotor. The remaining strokes of each piston will be controlled by said cam thus ensuring the proper timing of both strokes of each piston. The herein described engine is designed to work on the four-cycle principle, and the construction is not only such as to permit the effective operation of the engine at low speeds, as compared with the standard of reciprocatory internal combustion engines, but the compression stroke of each piston in either direction will occur during an interval when some other piston is developing power, so as to ensure substantial uniformity in the compression of the gaseous charge in each cylinder, and alternately upon opposite sides of the piston therein. Furthermore, the intake and exhaust arrangement is such as to ensure each cylinder receiving a full charge of the explosive mixture alternately upon opposite sides of the piston, and the free exhaust of the products of combustion from each cylinder, and on opposite sides of the piston therein alternately so as to avoid back pressure against the piston after the ignition stroke, and to minimize a tendency towards the overheating of the various cylinders and the co-operating parts of the engine casing. By laying out the cam, against which each piston acts, in substantial accord with the expansion curve of the gases ignited in the cylinder, high efficiency may be secured and the piston stroke may be reduced in a manner to secure economy in the operation of the engine. The arrangement of the cam, the thrust of the piston against which results in the turning of the power shaft through the reaction upon the rotor, is such as to secure a highly effective leverage for developing power in the rotor, and also ensures the application of this power directly to the rotor in a manner to relieve the piston itself from all stresses from the reaction thrust. By this arrangement, I am also enabled to provide an effective lubrication, not only of the cam, but of the pistons themselves.

By providing a single intake port, and a single exhaust port with which the intake and exhaust of all of the cylinders upon one side of the piston successively register, and a similar arrangement upon the other side thereof, I secure uniformity in the sequence of operation of each piston; as well as a simplicity of structure which avoids likelihood of a loss of efficiency in the engine, due to a disarrangement of parts. The various connections leading from said intake and said exhaust ports may, in this arrangement occupy a fixed position with relation to the engine thus permitting a direct connection between same and each of the cylinders.

By mounting the various cylinders within the stator, I am enabled to so construct the rotor as to permit the circulation about each cylinder of a suitable cooling agent, the admission and emission points of which are through the stator.

The invention consists in the novel features of construction and combination of parts hereinafter set forth and described and more particularly pointed out in the claims hereto appended.

Referring to the drawings:—

Like letters refer to like parts throughout the several views.

Figure 1:
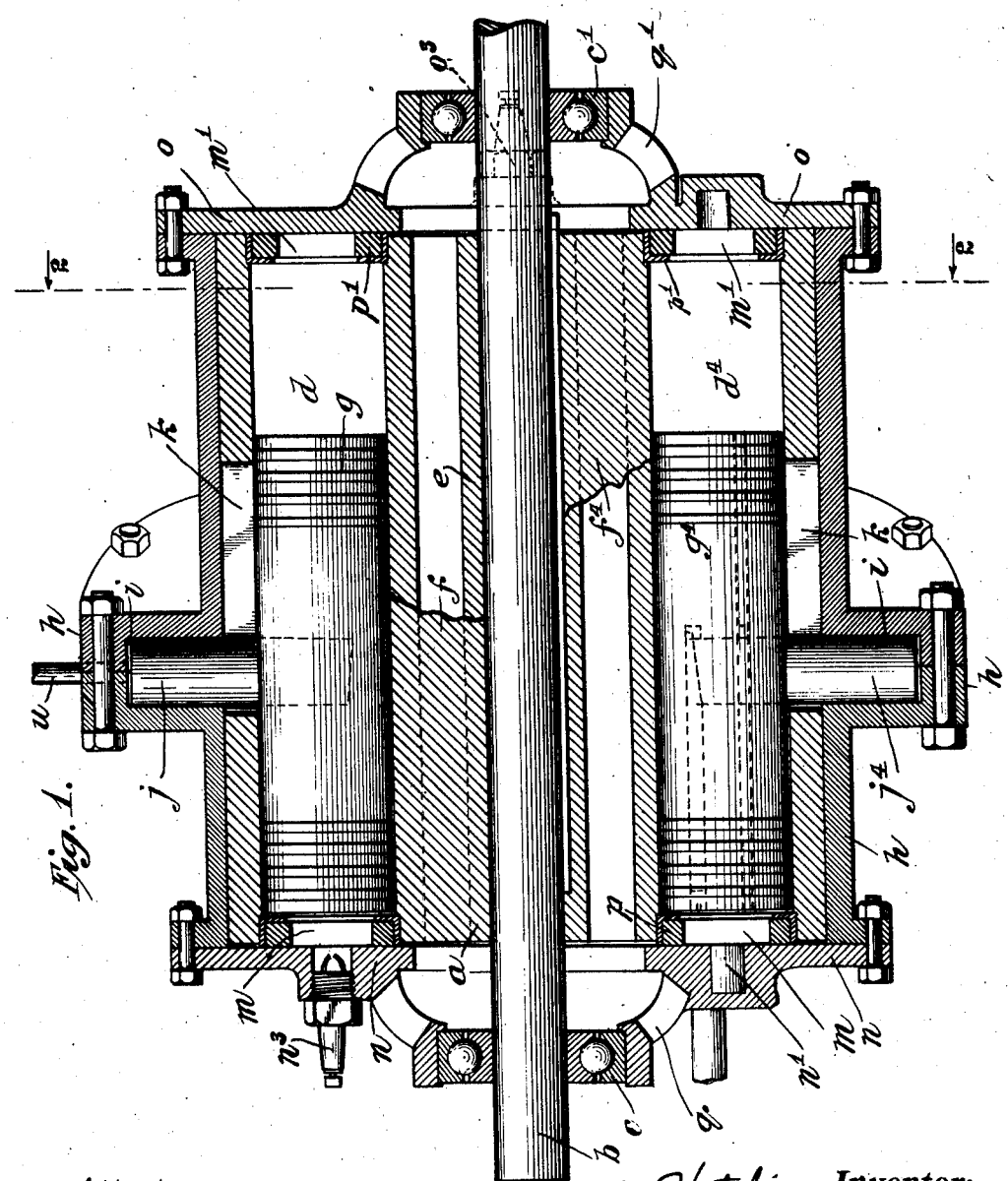
Fig. 1 is a longitudinal section through an engine embodying my invention.
Figure 2:
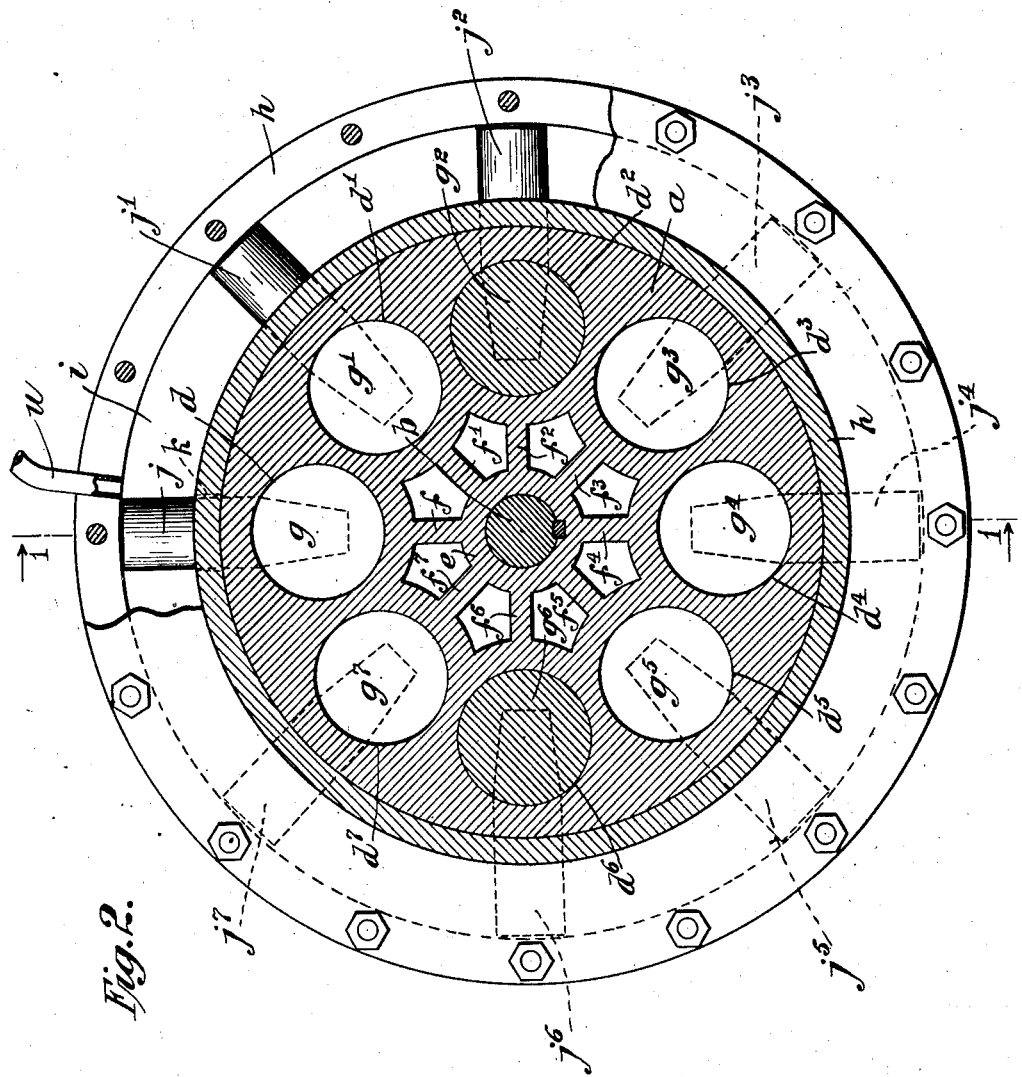
Fig. 2 is a section on the line 2—2 of Fig. 1.
Figure 3:
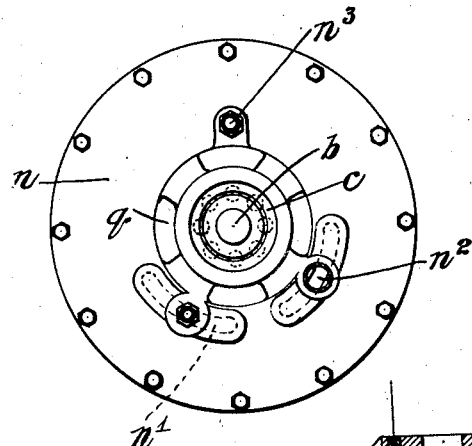
Fig. 3 is a view of the inside of one of the end rings having the intake and exhaust ports therein.
Figure 4:
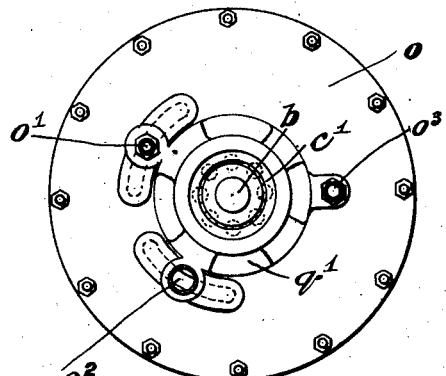
Fig. 4 is a similar view of the other end ring.

In the embodiment of my invention shown in the drawings, the rotor $a$ is carried by and rotatable with, the power shaft $b$ mounted in suitable bearings $c$—$c'$ carried by the engine casing or stator.

The rotor $a$ embodies therein a plurality of cylinders, the axes of which are parallel with that of the said power shaft $b$. In the form of the invention shown, these cylinders are eight in number, with the centers thereof substantially 45° apart. They are spaced away from the shaft $b$ sufficiently to permit the use of cylinders of the desired diameter, and are so separated as to secure the desired lightness in the engine structure and to permit the circulation of a cooling medium between, and about, the various cylinders. In the accompanying drawings, I have indicated the said cylinders by the reference numerals $d$—$d'$—$d^2$—$d^3$—$d^4$—$d^5$—$d^6$ and $d^7$, these cylinders respectively being supported from a hub $e$, keyed or otherwise secured to the shaft $b$, and webs $f$—$f'$—$f^2$—$f^3$—$f^4$—$f^5$—$f^6$ and $f^7$, the space between said webs and said cylinders, and said hub forming cooling areas for the several cylinders.

Mounted in the cylinders $d$—$d'$—$d^2$—$d^3$—$d^4$—$d^5$—$d^6$ and $d^7$ respectively are reciprocating double acting pistons $g$—$g'$—$g^2$—$g^3$—$g^4$—$g^5$—$g^6$ and $g^7$ which may be of any desired construction and are provided with the usual or any desired packing rings as shown.

Extending circumferentially about the rotor $a$ is a casing $h$ supporting a continuous sinusoidal housed cam or cam track $i$ having two rises $i'$—$i^2$ and two falls $i^3$—$i^4$, each of which extends for substantially 90°. These rises and falls of the cam $i$ extend obliquely to the axes of the various cylinders $d$ to $d^7$, the degree of this obliquity varying according to the engine dimensions and the required piston stroke. If desired this cam may be laid out so that upon either power stroke of each piston, the rise or fall of the cam operative with relation thereto during said stroke, will be in substantial accord with the theoretical curve of the expansion of the gases in the cylinder and thus ensure desirable working conditions in the engine, and the shortening of the power stroke of the piston.

Co-operating with the cam $i$ are thrust members $j$—$j'$—$j^2$—$j^3$—$j^4$—$j^5$—$j^6$ and $j^7$ carried by the pistons $d$ to $d^7$ respectively, said thrust members projecting through elongated slots $k$ in the outer wall of the respective cylinders $d$ to $d^7$ which slots extend parallel with the axes of said cylinders respectively.

By this construction I secure two desirable results. The pressure of the expanding charges in succeeding cylinders is applied by the several pistons through the several thrust members, against one of the rises or falls of the said cam with a resultant reaction directly upon the rotor instead of through the pistons to the rotor. Another desirable result is that the leverage of this thrust, is the most effective possible with an engine of any particular size.

Each cylinder $d$ to $d^7$ at the opposite ends thereof is provided with ports $m$—$m'$ of large dimensions through which the explosive charge enters the cylinder on opposite sides of the piston alternately, and the products of combustion are exhausted therefrom immediately following each power stroke of the piston in either direction.

Adjacent each end of the rotor, and in such close juxtaposition to the walls of the cylinders about the parts $m$—$m'$ as to admit of the formation of a sufficiently tight packing to hold the gases while being, or when fully, compressed, are continuous annular rings $n$—$o$ having a fixed position with relation to the stator. Each of these rings has therein an intake port $n'$—$o'$ in communication through suitable piping with a carburetor or carburetors, not shown in the drawings. Each of said rings also has therein an exhaust port $n^2$—$o^2$, arranged substantially 90° in advance of the ports $n'$—$o'$ so as to ensure an effective exhaustion of gases from each cylinder before the admission of a charge of the explosive mixture. Preferably these ports are elongated as shown, on the inside of the rings $n$—$o$ to afford an ample interval for the admission of a charge and the exhaustion of the spent gases. The length and width of these ports will vary with variance in the diameter of the cylinder, the length of the piston stroke, and the dictates of practice as to what may be necessary to avoid back firing into the intake.

I provide means whereby the explosive charge upon either side of the piston in each of the cylinders $d$ to $d^7$ will be fired when it has travelled approximately 90° after leaving the intake port $n'$ or $o'$, which means in the form of the invention shown comprises spark plugs $n^3$—$o^3$ carried by the rings $n$—$o$ respectively, and set substantially 90° beyond the end of the ports $n'$—$o'$. These spark plugs are set into the rings $n$ or $o$ sufficiently to afford the proper clearance for the packing about the ports $m$—$m'$ respectively. When such plugs are used, the engine may be accelerated or retarded by the usual timing mechanism now commonly used in ignition systems. If it be found that excessively high temperatures develop about the spark plug, when a plug common to all of the cylinders at opposite sides thereof, is used the ordinary or any other desired ignition system may be used.

It is essential that the rings $n$—$o$ be so set as to have the intake and exhaust ports, and the firing point of one ring substantially 90° in advance of those upon the other ring.

In the form of the invention shown in Figs. 1 to 4, the opposite ends of each of the cylinders $d$ to $d^7$ are of smaller diameter than the bore of the cylinder, and are each provided with an elastic or expansible packing ring $p$—$p'$ adapted to bear upon the inner face of the rings $n$—$o$ respectively.

In the accompanying drawings, I have shown an air cooled type of engine embodying my invention, the stator being provided, at the opposite ends thereof, with spiders $q$—$q'$ through which air may be drawn by the rotation of the rotor between the several vanes $f$ to $f^7$ and expelled at the opposite end of the casing by said vanes. These spiders in the form of the invention shown are utilized for supporting the rings $n$—$o$.

Figure 5:
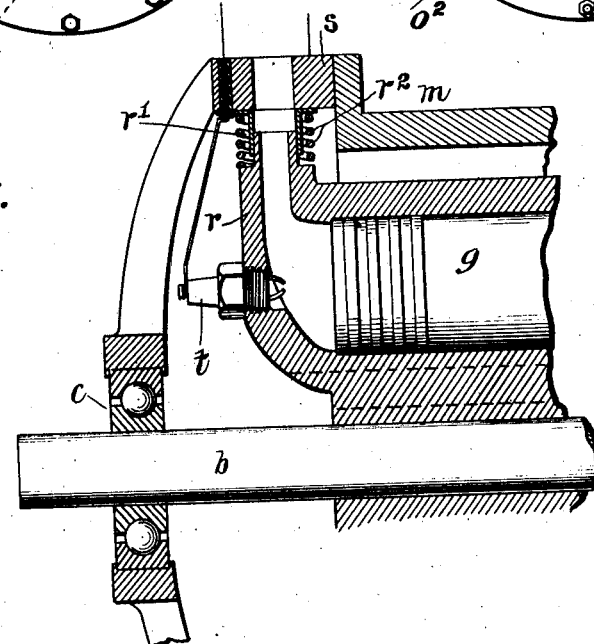
Fig. 5 is a view of a modified form of the cylinder design and the end rings.

In Fig. 5 of the accompanying drawings, I have shown a modification of the structure of several cylinders carried by the rotor as to the means by which each of the cylinders receives its explosive charge, and the products of combustion are exhausted therefrom. In this form of the invention, each cylinder is provided with an upward projection $r$ extending from the end thereof in a manner to present the ports $m$ or $m'$ radially of the axis of rotation of the rotor.

Mounted upon said extension and having a normally outward thrust under the control of the spring $r^2$ is a shoe nipple $r'$ adapted to bear upon the face of a ring $s$ provided with intake and exhaust ports arranged in the same relation as the ports $n'$—$n^2$ or $o$—$o^2$. This structure is duplicated at the opposite ends of each cylinder. In this form of the invention each cylinder is provided with a spark plug $t$, the electrical connections to which will be made only when the cylinder carrying the spark plug is in a certain position. The rings at the opposite ends of the rotor will be offset 90° with relation to each other in the manner heretofore described in connection with the form of the invention shown in Figs. 1 to 4.

The form of the invention shown in Fig. 5 may be in some respects more desirable than that shown in Figs. 1 to 4 in that the rings $s$ may be more readily lubricated and in that the expansion of the gases at the opposite ends of each cylinder will be against the cylinder head as distinguished from a ring $n$ or $o$, thus affording cooling areas directly at the head of each cylinder.

Furthermore, the action of the spring $r^2$ is supplemented by centrifugal force in ensuring the desired engagement of said shoe $r'$ with its ring.

The operation of the herein described engine is substantially as follows:—

In describing this operation, I will refer to functionings of the engine in relation to one of the cylinders $d$ to $d^7$ it being understood that the cycle of operation of one cylinder is the same as every other cylinder excepting as to the timing of the various operations. In starting, the engine is turned either by hand or otherwise, the cam groove $i$ reciprocating each of the pistons in accord with the rises and falls of said cam, the timing of these reciprocations being positively controlled by said cam. As the port $m$ of one of these cylinders, as $d$, passes the intake port $n'$, the piston $g$ in said cylinder will be moved away from said port in a manner to draw an explosive charge into the said cylinder on the side of said piston adjacent said port $m$. This piston movement will be under the control of the fall $i^4$ of the cam groove $i$ and the thrust member $j$ carried by the said piston $g$. As the said thrust member engages the rise $i'$ the direction of the piston movement will be reversed and the charge thus drawn into the cylinder will be compressed, and maximum compression being reached at the top of said rise and adjacent the spark plug $n^3$. As the cylinder is passing said spark plug the circuit thereto will be closed, thus causing the ignition of said charge.

The time of the ignition of the compressed charge may be varied within the limits of the interval during which the port $m$ is passing the spark plug $n^3$ through the circuit controlling means to said spark plug. This timing may be used for accelerating or retarding the engine speed or, in setting up the engine, to ensure that propagation of combustion within the cylinder which may be desirable to secure the desired effective power stroke. This condition must be taken into account in designing the engine, in locating the spark plug, or the means for causing the ignition of an explosive charge in the cylinder when each cylinder is provided with its own spark plug.

Upon the expansion of the gases in the cylinder following their ignition as above referred to, the resultant thrust of the piston $g$ will be applied to the fall $i^3$ of the cam groove $i$ through the thrust member $j$, thus causing a re-action of the force of the said thrust upon the rotor to impart movement thereto at a speed proportionate to the length and pitch of the said fall $i^3$.

As the thrust member $j$ passes from the fall $i^3$ to the rise $i^2$, the port $m$ will begin to come to register with the exhaust port $n^2$ so that the movement of the piston in conformity with the rise $i^2$ will result in an adequate exhaustion of the products of combustion from the cylinder, the size of the port $m$ and the prolongation of the exhaust port $n^2$ ensuring a sufficiently rapid exhaust to avoid back pressure in the cylinder. The cylinder $d$ upon leaving the rise $i^2$ and running into the fall $i^4$, will begin a new cycle of operations. The foregoing operation relates to the action of one cylinder and its appurtenances with relation to one end thereof only. The operation as to the other end of each cylinder will be the same except that the setting of the ring $o$ 90° with relation to the ring $n$ will time the admission of the explosive charge, its compression, its ignition and the exhaust of the products of combustion so as to permit the effective thrust of the piston to occur at a point where the thrust member $j$ will be applied upon the face of the cam $i$ opposite the rise $i^2$. In the development of the cam $i$ shown in Fig. 6, this condition is illustrated. In said view, the cylinder $d$ has a charge under compression at one end thereof and this charge is about to be fired. While at the other end thereof a charge has just been drawn into the cylinder. The cylinder $d'$ is applying power to the rotor at one end thereof and at the other end thereof is compressing the charge which has been drawn into this cylinder. The cylinder $d^2$ has completed its power stroke in one direction and completely compressed the charge at the other end thereof, which charge is about to be fired by the spark plug $o^3$. The cylinder $d^3$ at one end thereof is exhausting the products of combustion and at the other end thereof is developing power. The cylinder $d^4$ has completed the exhaust at one end and about to begin its intake stroke at that end while at the other end it has completed its power stroke and is about to begin the exhaust stroke. The cylinder $d^5$ at one end thereof is taking in gases while at the other end thereof it is exhausting gases. The cylinder $d^6$ at the one end thereof has completed the intake of the explosive charge and the products of combustion have been exhausted from the other end thereof while the cylinder $d^7$ at one end thereof is compressing the explosive charge and at the other end thereof is taking in a charge of explosive mixture.

In the foregoing, when I say one end of the cylinder, I refer to the portion between one side of the piston and the ring $n$, and when I say the other end of the cylinder, I refer to the portion between the other side of said piston and the ring $o$. While the cycle of operations as to all of the cylinders upon each end thereof, is always the same, it will be observed that the conditions at opposite ends of each cylinder differ because of the fact that each piston stroke is 90° in advance of the similar stroke at the other end.

At one end of the rotor with each cycle of operations the succeeding cycles will be, as to the piston strokes, intake, compression, power and exhaust, while upon the opposite end of the rotor the conditions opposed to these will be exhaust, intake, compression and power. Hence, while the power stroke at one side of the piston in one instance coincides with a compression stroke upon the other side thereof, the power stroke upon the other side of said piston co-incides with the exhaust stroke upon the first mentioned side of the piston which variance in conditions follows through each stroke of the cycle. From this arrangement, it will be observed that work is being done simultaneously on both ends of the rotor at all times. This condition, however, results through the continuous movement of the rotor under a direct application of power so that no speed fluctuations result therefrom.

It will be observed from the foregoing that there will be a substantially continuous application of power to the rotor and that this power is being applied at all times by at least two pistons, and a part of the time by four pistons. With each full rotation of the rotor it receives 16 power impulses, thus ensuring the development of substantially continuous power even though the engine be running at low speeds, and the engine is not dependent in any way upon the moving inertia of the rotor, although the unavoidable weight of the rotor will cause it to act as a fly wheel.

Figure 6:
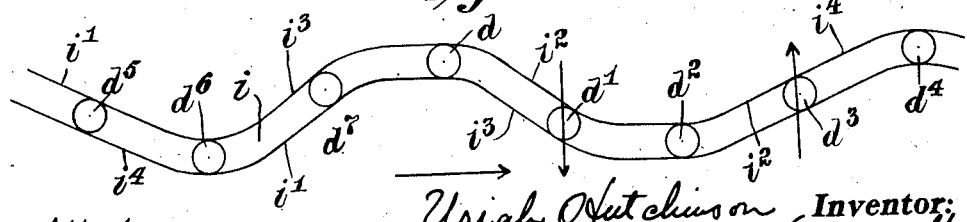
Fig. 6 is a development of the cam groove.

In Fig. 6 of the drawings, I have shown a merely conventional development of the cam $i$. Theoretically the pitch of the rises and falls of this cam, and particularly the falls against which the thrust members act, may be varied to conform to the varying pressure conditions within each end of each cylinder, so as to take full advantage of the expansive force of the gases. The length of the cam may also be varied so as to avoid, in the power stroke, the loss in energy due to the falling of the pressure within the cylinder toward the end of the stroke, if it be desired to shorten the piston stroke. By conforming the cam $i$ particularly as to the fall $i^3$ and the rise $i^2$, which are positioned so as to be effective during the power stroke of each piston upon opposite sides thereof, more or less to the theoretical curve of the expansion of the gases in an internal combustion engine cylinder, making due allowance for mechanical conditions, the effective thrust of each piston may be made to accord with the effective expansion of the gases within the cylinder.

By providing a slot $k$ through the wall of each cylinder and a thrust member carried by the piston and adapted to engage the side wall of said slot, the entire re-action thrust from the cam will be applied through said thrust member to the cylinder itself, thus relieving the piston from all stresses, except those resulting from the expansion of the explosive mixture and the resistance encountered by the thrust member resulting in the re-action above referred to.

By having the thrust members $j$ to $j^7$ extend radially through the outer wall of each cylinder and by having the cam groove of the stator surrounding the rotor, the power applied to the piston is directed against the same cam in a manner to secure the maximum leverage and highest efficiency.

While the engine is running, the temperature of the various cylinders will be reduced through the cooling medium passing through the openings between the vanes $f$ to $f^7$. The cooling system may be varied however, to meet the demands of various sizes and designs of engines embodying the invention.

By introducing lubricating oil to the cam groove $i$ through the pipe $u$, I not only secure the lubrication of the cam, but the oil may be delivered in such volume as to cause the accumulation thereof in the said groove to enter the various cylinders through the several slots $k$ and thus lubricate the several pistons.

If air cooling is found inadequate to preserve the proper temperature of the rings $n$—$o$ beyond the spark plugs $n^3$—$o^3$ respectively, any other desired cooling system may be substituted therefor. The rings $n$—$o$ or their equivalent being fixed with relation to the stator, the gas pipes and the exhaust pipes may be conveniently connected with these rings and, if a liquid cooling system is necessary, the water jacket may be applied to only that portion of the engine where the excessively high temperatures prevail.

It is not my intention to limit the invention to the details of construction shown in the accompanying drawings, it being apparent that the design of the engine may be varied indefinitely for the purpose of minimizing friction and for developing any required power. It is apparent that an engine which is required to develop a low H. P. may differ radically in design from an engine required to develop higher H. P. while still operating in substantially the same manner.

Having described the invention, what I claim as new and desire to have protected by Letters Patent is:—

1. A rotary internal combustion engine embodying therein a stator having a cam groove extending circumferentially about same, a rotor mounted within said stator, said rotor having a plurality of cylinders, each having a longitudinally extending slot therein adjacent said stator, the axis of each of said cylinders being parallel with the axis of rotation of said rotor, a power shaft driven from said rotor, a double acting piston mounted in each of said cylinders, each of said cylinders being provided at the opposite ends thereof with means whereby an explosive mixture may be delivered thereto and spent gases may be exhausted therefrom, a thrust member carried by each of said pistons projecting through the slot in its cylinder and engaging said cam groove, fixed rings at the opposite ends of said rotor, each having therein, in sequence, an intake port and an exhaust port, and means, operative when the end of each cylinder is intermediate the intake and exhaust ports cooperating therewith, for igniting the charge in each cylinder.

2. A rotary internal combustion engine embodying therein a stator having a cam groove extending circumferentially about same, a rotor mounted within said stator, said rotor having a plurality of cylinders, each having a longitudinally extending slot therein adjacent said stator, the axis of each of said cylinders being parallel with the axis of rotation of said rotor, a power shaft driven from said rotor, a double acting piston mounted in each of said cylinders, each of said cylinders being provided at the opposite ends thereof with means whereby an explosive mixture may be delivered thereto and spent gases may be exhausted therefrom, a thrust member carried by each of said pistons projecting through the slot in its cylinder and engaging said cam groove, fixed rings at the opposite ends of said rotor, each having therein, in sequence, an intake port and an exhaust port, said ports in each of said rings being staggered in relation to the corresponding ports in the other ring whereby the strokes in the cycle of operations at one end of each piston will be alternated with the corresponding strokes in the cycle of operations at the other end of each piston, and means, operative when the end of each cylinder is intermediate the intake and exhaust port cooperating therewith, for igniting the charge in each cylinder.

3. A rotary internal combustion engine embodying therein a stator having a cam groove extending circumferentially about same, a rotor mounted within said stator, said rotor having a plurality of cylinders, each having a longitudinally extending slot therein adjacent said stator, the axis of each of said cylinders being parallel with the axis of rotation of said rotor, a power shaft driven from said rotor, a double acting piston mounted in each of said cylinders, each of said cylinders being provided at the opposite ends thereof with means whereby an explosive mixture may be delivered thereto and spent gases may be exhausted therefrom, a thrust member carried by each of said pistons projecting through the slot in its cylinder and engaging said cam groove, fixed rings at the opposite ends of said rotor, each having therein, in sequence, an intake port and an exhaust port, means, operative when the end of each cylinder is intermediate the intake and exhaust port cooperating therewith, for igniting the charge in each cylinder, and supporting means for said cylinders whereby cooling areas are provided within said rotor.

4. A rotary internal combustion engine embodying therein a stator having a cam groove extending circumferentially thereabout, a rotor mounted within said stator and having a plurality of cylinders, the axes of which are parallel with the axis of rotation of said rotor, a power shaft driven from said rotor, a double acting piston mounted in each of said cylinders each of said cylinders being provided at the opposite ends thereof with means whereby an explosive mixture may be delivered thereto and spent gases may be exhausted therefrom, a thrust member projecting radially of said piston into engagement with said cam groove and rings at the opposite end of said rotor, each of said rings having therein in sequence an intake port, means controlling the ignition of a gaseous charge in each of said cylinders and an exhaust port.

5. A rotary internal combustion engine embodying therein a stator having a cam groove extending circumferentially about same, a rotor mounted within said stator, said rotor having a plurality of cylinders, each having a longitudinally extending slot therein adjacent said stator, the axis of each of said cylinders being parallel with the axis of rotation of said rotor, a power shaft driven from said rotor, a double acting piston mounted in each of said cylinders, each of said cylinders being provided at the opposite ends thereof with means whereby an explosive mixture may be delivered thereto and spent gases may be exhausted therefrom, a thrust member carried by each of said pistons projecting through the slot in its cylinder and engaging said cam groove, fixed rings at the opposite ends of said rotor, each having therein, in sequence, an intake port and an exhaust port, means operative when the end of each cylinder is intermediate the intake and exhaust ports co-operating therewith, for igniting the charge in each cylinder, a hub rotatable with said power shaft, and longitudinally extending webs connected with said hub, and said cylinders and spaced apart to provide cooling areas within said rotor.

6. A rotary internal combustion engine embodying therein a stator having a cam groove extending circumferentially about same, a rotor mounted within said stator, said rotor having a plurality of cylinders, each having a longitudinally extending slot therein adjacent said stator, the axis of each of said cylinders being parallel with the axis of rotation of said rotor, a power shaft driven from said rotor, a double acting piston mounted in each of said cylinders, each of said cylinders being provided at the opposite ends thereof with means whereby an explosive mixture may be delivered thereto and spent gases may be exhausted therefrom, a thrust member carried by each of said pistons projecting through the slot in its cylinder and engaging said cam groove, fixed rings at the opposite ends of said rotor, each having therein, in sequence, an intake port and an exhaust port, said ports in each of said rings being staggered in relation to the corresponding ports in the other ring whereby the strokes in the cycle of operations at one end of each piston will be alternated with the corresponding strokes in the cycle of operations at the other of each piston, means operative when the end of each cylinder is intermediate the intake and exhaust port co-operating therewith, for igniting the charge in each cylinder, a hub rotatable with said power shaft, and longitudinally extending webs connected with said hub and said cylinders and spaced apart to provide cooling areas within said rotor.

7. A rotary internal combustion engine embodying therein a stator having a cam groove extending circumferentially about same, a rotor mounted within said stator, said rotor having a plurality of cylinders, each having a longitudinally extending slot therein adjacent said stator, the axis of each of said cylinders being parallel with the axis of rotation of said rotor, a power shaft driven from said rotor, a double acting piston mounted in each of said cylinders, each of said cylinders being provided at the opposite ends thereof with a single normally open port whereby an explosive mixture may be delivered thereto and spent gases may be exhausted therefrom, a thrust member carried by each of said pistons projecting through the slot in its cylinder and engaging said cam groove, fixed rings at the opposite ends of said rotor, each having therein, in sequence, an intake port and an exhaust port, and means, operative when the end of each cylinder is intermediate the intake and exhaust port co-operating therewith, for igniting the charge in each cylinder.

8. A rotary internal combustion engine embodying therein a stator having a cam groove extending circumferentially about same, a rotor mounted within said stator, said rotor having a plurality of cylinders, each having a longitudinally extending slot therein adjacent said stator, the axis of each of said cylinders being parallel with the axis of rotation of said rotor, a power shaft driven from said rotor, a double acting piston mounted in each of said cylinders, each of said cylinders being provided at the opposite ends thereof with a single normally open port, whereby an explosive mixture may be delivered thereto and spent gases may be exhausted therefrom, a thrust member carried by each of said pistons, projecting through the in its cylinder and engaging said cam groove, fixed rings at the slot opposite ends of said rotor, each having therein in sequence an intake port and an exhaust port, and a spark plug arranged intermediate said intake and said exhaust port of each ring and common to all of said cylinders.

9. A rotary internal combustion engine embodying therein a series of cylinders carried by a rotor, a power shaft driven from said rotor, a piston mounted in each of said cylinders, means whereby the reciprocatory movement of said piston will be converted into a rotary movement of said rotor, each of said cylinders being provided with a single normally open port at the end thereof, and a ring adjacent it end of said cylinders, said ring having therein an intake port and an exhaust port with which the normally open port in said cylinder is adapted to successively register and a spark plug intermediate said intake and said exhaust port adapted to fire the charge in said cylinder through said normally open port, said ports and said spark plugs in each of said rings being staggered in relation to the corresponding ports and the spark plug in the other ring, whereby the strokes in the cycle of operation at one end of each piston will be alternated with the corresponding strokes in the cycle of operations at the other end of each piston.

In witness whereof I have hereunto affixed my signature this 23rd day of March, 1916.

URIAH HUTCHINSON.